United States Patent [19]

Fuentes, Jr. et al.

[11] Patent Number: 4,529,715
[45] Date of Patent: Jul. 16, 1985

[54] CATALYST PREPARED FROM ORGANOMAGNESIUM COMPOUND, CARBON DIOXIDE, REDUCING ALUMINUM SOURCE, TRANSITION METAL COMPOUND AND ZINC COMPOUND

[75] Inventors: Ricardo Fuentes, Jr.; Calvin P. Esneault, both of Baton Rouge, La.

[73] Assignee: The Dow Chemical Company, Midland, Mich.

[21] Appl. No.: 542,854

[22] Filed: Oct. 17, 1983

[51] Int. Cl.$^3$ ............ C08F 4/62; C08F 4/64; C08F 4/68

[52] U.S. Cl. .................. 502/115; 502/120; 526/125; 526/138

[58] Field of Search ................. 502/115, 120

[56] References Cited

U.S. PATENT DOCUMENTS

| | | | |
|---|---|---|---|
| 3,412,174 | 11/1968 | Kroll | 502/117 X |
| 3,901,863 | 8/1975 | Berger et al. | 260/88.2 R |
| 4,115,319 | 9/1978 | Scata et al. | 252/429 B |
| 4,199,473 | 4/1980 | Timms | 502/115 X |
| 4,244,838 | 1/1981 | Gessell | 502/115 X |
| 4,246,383 | 1/1981 | Gessell | 526/92 |
| 4,250,286 | 2/1981 | Shipley | 502/115 X |
| 4,269,733 | 5/1981 | Shipley | 502/115 |

FOREIGN PATENT DOCUMENTS

| | | |
|---|---|---|
| 0000007 | 6/1978 | European Pat. Off. . |
| 2758312 | 7/1978 | Fed. Rep. of Germany . |
| 51-111281 | 10/1976 | Japan . |
| 51-148785 | 12/1976 | Japan . |
| 762246 | 3/1977 | South Africa . |
| 1502567 | 3/1968 | United Kingdom . |
| 1235062 | 6/1971 | United Kingdom . |
| 1538472 | 1/1979 | United Kingdom . |
| 1539175 | 1/1979 | United Kingdom . |

*Primary Examiner*—Patrick P. Garvin
*Attorney, Agent, or Firm*—James G. Carter

[57] ABSTRACT

A catalyst for polymerizing olefins is the product resulting from a mixture of (A) an organomagnesium material, (B) essentially anhydrous carbon dioxide, (C) a reducing halide source and (D) the reaction product or complex resulting from admixing a transition metal compound and an organozinc compound.

8 Claims, No Drawings

CATALYST PREPARED FROM ORGANOMAGNESIUM COMPOUND, CARBON DIOXIDE, REDUCING ALUMINUM SOURCE, TRANSITION METAL COMPOUND AND ZINC COMPOUND

BACKGROUND OF THE INVENTION

This invention relates to a new catalyst composition useful for initiating and promoting polymerization of one or more α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agent such as an aqueous basic solution. Such catalyst deactivation and/or removal procedures are expensive both in time and material consumed as well as the equipment required to carry out such treatment.

Gessell's U.S. Pat. Nos. 4,244,838 and 4,246,383 and pending applications Ser. No. 192,959 filed Oct. 1, 1980 and now U.S. Pat. No. 4,496,660 and 360,865 filed Mar. 22, 1982 now U.S. Pat. No. 4,387,200, by Gessell, Gibbs and Fuentes, Jr., disclose catalysts prepared by employing an organic hydroxyl-containing material or carbon dioxide. However, such catalysts are directed only to the resultant solid reaction product which must be separated from the liquid portion and washed. It would be desirable to employ a catalyst which does not require the recovery of the solid reaction product and the attendant washing steps.

In addition, pending applications Ser. No. 573,891 filed Jan. 25, 1984 and Ser. No. 590,806 filed Mar. 19, 1984 by C. P. Esneault, R. Fuentes, Jr. and L. A. Meiske disclose catalysts prepared by employing carbon dioxide with a magnesium dialkyl, a titanium compound, and a reducing aluminum alkyl halide. Those catalysts did not require washing of the catalyst solids for effective polymerization, but they did require a thermal treatment step at low ratios of aluminum alkyl halide/Mg to insure high catalyst efficiency.

The present invention provides a catalyst for polymerizing α-olefins which catalysts are sufficiently active so as to not require their removal from the polymer. Their preparation does not require recovery and washing of the solid reaction product nor thermal treatment at low ratios of aluminum alkyl halide/Mg to insure high catalyst efficiency.

SUMMARY OF THE INVENTION

The present invention is directed to a catalytic product resulting from admixing in an inert hydrocarbon diluent and in an atmosphere which excludes moisture and oxygen (A) at least one hydrocarbon soluble organomagnesium material;

(B) essentially anhydrous carbon dioxide;

(C) at least one reducing aluminum halide (X) source; and (D) the reaction product or complex formed from mixing at a temperature and for a time sufficient to provide a color change (1) at least one transition metal (Tm) compound having at least one hydrocarbyloxy attached to said transition metal and (2) at least one organozinc compound; and wherein (a) the components are added in the order (A), (B), (C) and (D) or (A), (B), (D) and (C); and (b) the components are employed in quantities so as to provide the following atomic ratios Mg:Tm of from about 0.1:1 to about 100:1, preferably from about 1:1 to about 40:1 and most preferably from about 5:1 to about 30:1 with the proviso that when the transition metal compound contains a halogen atom, the ratio is from about 2:1 to about 100:1, preferably from about 2:1 to about 40:1, and most preferably from about 5:1 to about 30:1;

Zn:Tm of from about 0.01:1 to about 10:1, preferably from about 0.1:1 to about 5:1, and most preferably from about 0.2:1 to about 2:1;

X:Mg of from about 2:1 to about 20:1, preferably from about 3:1 to about 12:1 and most preferably from about 3.5:1 to about 8:1; and $CO_2$:Mg (molar ratio of $CO_2$:atoms of Mg) of from about 1:1 to about 2:1 and preferably sufficient $CO_2$ such that further addition of $CO_2$ to component (A) will not result in any further reaction of $CO_2$ as indicated by no further absorption of $CO_2$ or no further exotherm.

A further aspect of the invention is a process for polymerizing α-olefins or mixtures thereof which comprises conducting the polymerization in the presence of the aforementioned catalysts.

DESCRIPTION OF THE PREFERRED EMBODIMENTS

The organomagnesium materials which are suitably employed in the present invention include those represented by the formula $R_2Mg \cdot xMeR'_{x'}$ wherein each R is independently a hydrocarbyl group and each R' is independently a hydrogen, hydrocarbyl or hydrocarbyloxy group, Me is Al, Zn or B, x has a value from 0 to 10 and x' has a value equal to the valence of Me.

The term hydrocarbyl as employed herein refers to a monovalent hydrocarbon group such as alkyl, cycloalkyl, aryl, aralkyl, alkenyl and similar hydrocarbon groups having from 1 to about 20 carbon atoms with alkyl having from 1 to 10 carbon atoms being preferred.

The term hydrocarbyloxy as employed herein refers to monovalent oxyhydrocarbon group such as alkoxy, cycloalkoxy, aryloxy, aralkoxy, alkenoxy and similar oxyhydrocarbon groups having from 1 to about 20 carbon atoms with alkoxy groups having from 1 to 10 carbon atoms being the preferred hydrocarbyloxy groups.

The quantity of $MeR'_{x'}$, i.e. the value of x, is preferably the minimum amount which is sufficient to render the magnesium compound soluble in the inert solvent or diluent which is usually a hydrocarbon or mixture of hydrocarbons. The value of x therefore is from zero to about 10, usually from about 0.2 to about 2.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-(n-octyl) magnesium, butyl octyl magnesium and such complexes as di-n-butyl magnesium·½ aluminum triisobutyl, di-(n-butyl) magnesium·1/6 aluminum triethyl, butyl ethyl magnesium·½ triisobutyl aluminum, butyl ethyl magnesium·¼ triisobutyl aluminum, dibutyl magnesium·¼ triisobutyl aluminum, mixtures thereof and the like.

By the term essentially anhydrous carbon dioxide, it is meant that carbon dioxide which is at least 99.5% pure carbon dioxide and is denoted "commercial" grade up to and including pure carbon dioxide. It is preferred that the $CO_2$ be 99.8% or more pure $CO_2$.

The catalysts are most advantageously prepared by bubbling $CO_2$ through the hydrocarbon solution containing the magnesium compound or by employing the $CO_2$ at a sufficiently high pressure to cause the $CO_2$ to react with the hydrocarbon-soluble magnesium compound. Addition of $CO_2$ by either method results in an exothermic reaction.

The value of x in the magnesium component is preferably sufficient such that the product resulting from the admixture of components (A) and (B) is hydrocarbon soluble.

Suitable reducing halide sources include those represented by the formulas $$Al(R^3)_{3-m}X_m \text{ and } B(R^3)_{3-m}X_m$$

including mixtures thereof wherein each $R^3$ is independently hydrogen or a hydrocarbyl group as hereinbefore defined, and m has a value from 1 to 2.

Particularly suitable reducing aluminum halides include, for example, ethylaluminum dichloride, diethylaluminum chloride, ethylaluminum sesquichloride, mixtures thereof and the like.

Suitable zinc compounds which can be advantageously employed are those represented by the formulae $R_2Zn$ or $RZnX$ wherein each R is independently a hydrocarbyl group having from 1 to about 20, preferably from 1 to about 10, carbon atoms and X is a halogen, preferably chlorine or bromine. Particularly suitable zinc compounds include, for example, diethyl zinc, diphenyl zinc, ethyl zinc chloride, mixtures thereof and the like.

Suitable transition metal compounds which can be employed include those represented by the formulae $Tm(OR'')_nX_{z-n}$ or $Tm(OR'')_2O$, wherein Tm is a transition metal in its highest stable valence state and being selected from groups IV-B, V-B and VI-B of the Periodic Table of the Elements; each R'' is a hydrocarbyl group having from 1 to about 20, preferably from 1 to about 10, carbon atoms; X is a halogen, preferably chlorine or bromine; z has a value corresponding to the valence of the transition metal, Tm; n has a value of from one to the valence state of the transition metal, Tm.

Particularly suitable transition metal compounds include, for example, tetraethoxytitanium, tetraisopropoxytitanium, tetra-n-propoxytitanium, tetra-n-butoxytitanium, tetra-(2-ethylhexoxy)titanium, tetraphenoxytitanium, tetrabutoxyzirconium, tri-n-butoxy vanadium oxide, tri-isopropoxy vanadium oxide, zirconium tetra-n-propoxide, zirconium tetraixopropoxide, mixtures thereof and the like.

When preparing the catalysts, it is particularly advantageous to employ the organozinc:transition metal complex in a pre-mixed form. The pre-mix is most advantageously formed by the addition of one compound to the other, in no particular order, in a hydrocarbon solvent. Typical commercially available organozinc compounds are dissolved in hydrocarbon solvent. The concentration of the components and temperature of mixing determine the time necessary for a distinct color change. The color change varies depending on the particular components employed.

The catalyst components may be mixed in an addition order of (A), (B), (C) and (D) or (A), (B), (D) and (C). It is preferable to mix the catalysts, however, in the addition order of (A), (B), (C) and (D).

Suitable organic inert diluents in which the catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane, dimethylcyclohexane, dodecane, eicosane industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Suitable cocatalysts or activators with which the catalysts of the present invention can be reacted, contacted or employed in the polymerization of α-olefins includes those aluminum, boron, zinc or magnesium compounds represented by the formulas $Al(R^3)_{3-a}X'_a$, $B(R^3)_{3-a}X'_a$, $MgR^3_2$, $MgR^3X'$, $ZnR^3_2$ or mixtures thereof wherein $R^3$ is as previously defined; X' is a halogen, preferably chlorine or bromine; and a has a value of from zero to 2, preferably zero to 1 and most preferably zero.

Particularly suitable cocatalysts or activators include, for example, diethylaluminum chloride, ethylaluminum dichloride, diethylaluminum bromide, triethylaluminum, triisobutylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the atomic ratio of the Al, B, Mg, Zn or mixtures thereof to Tm is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts i.e., up to about 25 weight percent based on the polymer of other polymerizable ethylenically unsaturated monomers such as styrene, α-methylstyrene and similar ethylenically unsaturated monomers which do no destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar α-olefin or α-diolefin based on total monomer.

In the polymerization process employing the aforementioned catalytic reaction product, polymerization is effected by adding a catalytic amount of the catalyst composition to a polymerization zone containing α-olefin monomer, or vice versa. The polymerization zone is maintained at temperatures in the range from about 0° to about 300° C., preferably at slurry polymerization temperatures, e.g., from about 0° to about 95° C., more preferably from about 50° to about 90° C., for a residence time of from about 15 minutes to about 24 hours, preferably from about 30 minutes to about 8 hours. It is generally desirable to carry out the polymerization in the absence of moisture and oxygen and a catalytic amount of the catalytic reaction product is generally within the range from about 0.0001 to about 0.1 milligram-atoms transition metal per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment which can be as high as 2000 atmospheres and above. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present, and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the melt index values, $I_2$, were determined by ASTM D 1238 condition E. The apparent bulk density was determined as an unsettled bulk density according to the procedure of ASTM 1895 employing a paint volumeter from the Sargent-Welch Scientific Company (catalog no. S-64985) as the cylinder instead of the one specified by the ASTM procedure.

GENERAL PROCEDURE

In each of the following examples, unless otherwise stated, the catalyst components were blended while in a gloved box filled with dry oxygen-free nitrogen. The di-n-hexylmagnesium was a commercial material obtained as a hexane solution from the Ethyl Corporation or Texas Alkyls, Inc. The ethylaluminum dichloride, triisobutylaluminum, triethylaluminum and the diethyl zinc were obtained as solutions in hexane from Ethyl Corporation or Texas Alkyls, Inc.

EXAMPLE 1

A. Preparation of Magnesium-Carbon Dioxide Reaction Mixture

In a glove box, 400 ml of 0.808 molar di-n-hexylmagnesium (323.2 mmoles Mg) in hexane were diluted to 800 ml with additional hexane. This solution was transferred to a 1000 ml round bottom flask which had been previously purged with nitrogen. Then carbon dioxide was bubbled through the system at an observed pressure of about 2 psi (13.8 kPa) over about two hours (7200 s). Temperature was 22° C. prior to carbon dioxide addition. Temperature was 40°±3° C. for the first 75 minutes (4500 s). Carbon dioxide was bubbled through for an additional 45 minutes (2700 s), the temperature gradually decreasing to about 25° C. over that time period. Nitrogen was then bubbled through the solution to remove unreacted carbon dioxide. The solution flask was stopped and transferred to a nitrogen filled glove box. The concentration of magnesium in this stock solution was 0.404 molar.

B. Preparation of Catalyst

To 100 ml of the product from A above (containing 40.4 mmoles of the magnesium-carbon dioxide reaction mixture) were added 3.3 ml of a pre-mixed hexane solution containing a total of 2.69 mmoles diethyl zinc (DEZ) and 2.69 mmoles tetraisopropoxytitanium (TIPT). The addition of the TIPT:DEZ mixture turned the previously colorless clear solution to a light green. Then 52.8 ml of 1.53 molar ethylaluminum dichloride (80.8 mmoles) in hexane were added dropwise at ambient temperature (about 25° C.). A dark tan solid formed after addition of the ethylaluminum dichloride. The catalyst was stirred for 16 hours (57600 s) at ambient temperature. The final catalyst appearance was a beige solid with a clear, colorless supernatant. The molar ratios of Mg:Ti, Zn:Ti, and Cl:Mg were 15.0:1.0, 1.0:1.0 and 4.0:1.0, respectively.

C. Polymerization

To a stirred 1.0 liter reactor containing 0.6 liter of dry, oxygen-free hexane were added 1.0 ml of 0.616 molar triisobutylaluminum (0.616 mmoles) and an aliquot of catalyst prepared in B above containing 0.003 mmoles of titanium under nitrogen purge. The molar ratio of Al:Ti was 200:1. The reactor was sealed, successively purged with nitrogen and hydrogen, then heated to 85° C. The pressure was adjusted to 70 psig (483 kPa) with hydrogen and then ethylene was introduced into the reactor. Pressure was maintained at 170 psig (1172 kPa) total by ethylene on demand for two hours (7200 s). The reactor was then cooled, the seal broken, and the reactor contents removed. The polyethylene was filtered, air dried, then dried in a vacuum at 75° C. The final yield of dry polyethylene was 87 g, melt index ($I_2$) was 0.79, and the apparent bulk density was 21.1 lb/ft$^3$ (0.34 g/cc). Catalyst efficiency was 605,000 g PE/g Ti.

EXAMPLE 2

A. Preparation of Catalyst

To 100 ml of the product prepared in Example 1-A containing 40.4 mmoles of magnesium, were added over one-hour (3600 s) 52.8 ml of 1.53 molar ethylaluminum dichloride (80.8 mmoles) prior to addition of the TIPT:DEZ mixture. After complete addition of the ethylaluminum dichloride a white slurry was formed. Then 3.3 ml of a hexane solution containing 2.69 mmoles of tetraisopropoxytitanium and 2.69 mmoles of diethyl zinc were added in a dropwise manner. The catalyst slurry immediately changed color to a medium tan. After five minutes (300 s), the catalyst slurry was a medium to dark brown. The catalyst solids were medium to dark brown while the supernatant was clear and colorless. The catalyst was stirred for sixteen hours (57600 s), but the catalyst appearance had not changed over that time. The molar ratios of Mg:Ti, Zn:Ti and Cl:Mg were 15.0:1.0, 1.0:1.0 and 4.0:1.0, respectively.

B. Polymerization

Ethylene was polymerized in a manner similar to Example 1-C above, except 1.1 ml of triisobutylaluminum (0.68 mmoles) and an aliquot of catalyst from A above containing 0.0035 mmoles titanium were used. The molar ratio of Al:Ti was 200:1. The dried polyethylene weighed 77 g, had a melt index ($I_2$) of 0.94, and a bulk density of 21.1 lb/ft$^3$ (0.34 g/cc). Catalyst efficiency was 459,000 g PE/g Ti.

EXAMPLE 3

A. Preparation of Magnesium-Carbon Dioxide Reaction Mixture

In a nitrogen-filled glove box, a 1.0 liter stainless steel reactor was charged with 238.0 ml of 0.840 molar di-n-hexylmagnesium (199.9 mmoles). Then, fresh dry hexane was added so that the final volume was about 700 ml. The reactor was sealed and removed from the glove box. The reactor contents were treated with carbon dioxide while stirring. Carbon dioxide was added so that the reactor pressure was 20 psig (138 kPa). An exotherm to about 25° occurred. The exotherm was allowed to dissipate to about 22° C. prior to addition of more carbon dioxide. The reactor pressure decreased gradually to about 10 psig (69 kPa) as carbon dioxide was consumed. Then the reactor was re-pressurized to 20 psig (138 kPa) with carbon dioxide. This procedure was repeated so that an average temperature of about 25° C. and an average pressure of 15–20 psig (103–138 kPa) were maintained for two hours (7200 s). After two hours (7200 s) no more absorption of carbon dioxide was observed as evidenced by the constant 20 psig (138 kPa) pressure in the reactor. The excess carbon dioxide was removed by venting, then by successive purging with dry nitrogen. The reactor was then transferred to the glove box, the volume adjusted to 0.80 liter with fresh dry hexane and the contents stored in a sealed glass bottle. The concentration of magnesium in this stock solution was 0.250 molar.

B. Catalyst Preparation

To 100 ml of stock solution from A above containing 25.0 mmoles magnesium, were added in a dropwise manner a 1.5 ml hexane solution containing 1.25 mmoles tetraisopropoxytitanium and 1.25 mmoles of diethyl zinc. The TIPT:DEZ solution had been pre-mixed about one hour (3600 s) prior to use and its color was dark green. Then 32.7 ml of 1.53 molar ethylaluminum dichloride (50.03 mmoles) were added dropwise. The resulting dark tan catalyst slurry was stirred for four hours (14,400 s). The molar ratios of Mg:Ti, Zn:Ti and Cl:Mg were 20:1, 1:1 and 4:1, respectively.

C. Polymerization

Ethylene was polymerized in a manner similar to Example 1-C, except that 1.0 ml of 0.616 molar triisobutylaluminum (0.616 mmoles) and an aliquot of catalyst from B above prepared above containing 0.003 mmoles of titanium were used. The molar ratio of Al:Ti was 205:1 and the reactor was pressured to only 60 psig (414 kPa) with hydrogen prior to ethylene. The dried polyethylene weighed 104 g, had a melt index ($I_2$) of 0.27 and a bulk density of 16.2 lb/ft$^3$ (0.26 g/cc). The catalyst efficiency was 724,000 g PE/g Ti.

EXAMPLE 4

A catalyst was made using the same ratios and components as in Example 3-B above, except that the order of addition was magnesium component, ethylaluminum dichloride, and TIPT:DEZ pre-mix. To 100 ml of stock solution prepared in Example 3-A containing 25.0 mmoles of magnesium were first added 32.7 ml of 1.53 molar ethylaluminum dichloride (50.0 mmoles) at a rate of about 30 ml/hr. The mixture consisted of a white solid and a colorless supernatant. Then 1.5 ml of solution containing 1.25 mmoles tetraisopropoxytitanium and 1.25 mmoles of diethyl zinc was added to the mixture, resulting in tan-gold precipitate and a colorless supernatant after 2 hours (7200 s) of stirring. The TIPT:DEZ solution was mixed about 1 hour (3600 s) prior to use. The molar ratios of Mg:Ti, Zn:Ti and Cl:Mg were 20.0:1.0, 1.0:1.0 and 4.0:1.0, respectively.

B. Polymerization

Ethylene was polymerized in the same manner as Example 3-C, except that 1.0 ml of 0.616 molar triisobutylaluminum (0.616 mmoles) and an aliquot of catalyst prepared in A above containing 0.003 mmoles of titanium were used. The molar ratio of Al:Ti was 205:1. The dried polyethylene weighed 196 g, had a melt index ($I_2$) of 0.59, and a bulk density of 16.4 lb/ft$^3$ (0.26 g/cc). The catalyst efficiency was 1,364,000 g PE/g Ti.

C. Polymerization

Ethylene was polymerized in the same manner as Example 1-C above except that 2.2 ml of 0.184 molar triethylaluminum (0.405 mmoles) and an aliquot of catalyst prepared in A above containing 0.002 mmoles titanium were used. The molar ratio of Al:Ti was 202:1. The dried polyethylene weighed 199 g, had a melt index ($I_2$) of 0.79, and a bulk density of 18.1 lb/ft$^3$ (0.29 g/cc). The catalyst efficiency was 2,077,000 g PE/g Ti.

We claim:

1. A catalytic product resulting from admixing in an inert hydrocarbon diluent and in an atmosphere which excludes moisture and oxygen
   (A) at least one hydrocarbon soluble organomagnesium material;
   (B) essentially anhydrous carbon dioxide;
   (C) at least one reducing aluminum halide (X) source; and
   (D) the reaction product or complex formed from the admixture of (1) at least one transition metal (Tm) compound and (2) at least one organozinc compound; and wherein
   (1) the components are added in the order (A), (B), (C) and (D) or (A), (B), (D) and (C); and
   (2) the components are employed in quantities so as to provide the following atomic ratios
      Mg:Tm of from about 0.1:1 to about 100:1 with the proviso that when the transition metal compound contains a halogen atom the ratio is from 2:1 to about 100:1;
      Zn:Tm of from about 0.01:1 to about 10:1;
      X:Mg of from about 2:1 to about 20:1; and
      $CO_2$:Mg (the quantity of $CO_2$ is such that further addition of $CO_2$ to component (A) does not result in any further reaction of $CO_2$ as indicated by no further absorption of $CO_2$ or no further exotherm).

2. A catalytic product of claim 1 wherein
   (1) Component (A) is represented by the formula R$_2$Mg.xMeR'$_{x'}$ wherein each R is independently a hydrocarbyl group having from 1 to about 20 carbon atoms; each R' is independently a hydrogen, hydrocarbyl or hydrocarbyloxy group having from 1 to about 20 carbon atoms; Me is Al, Zn or B; x has a value from zero to 10 and is sufficient to render the organomagnesium component hydrocarbon soluble; and x' has a value equal to the valence of Me;
   (2) component (C) is represented by the formula Al(R$^3$)$_{3-m}$X$_m$ wherein each R$^3$ is independently hydrogen or a hydrocarbyl group as above defined, X is chlorine or bromine and m has a value from 1 to 2;
   (3) component (D-1) is represented by the formulae Tm(OR″)$_n$X$_{z-n}$ or Tm(OR″)$_2$O, wherein Tm is a transition metal in its highest stable valence state and being selected from groups IV-B, V-B and VI-B of the Periodic Table of the Elements; each R″ is a hydrocarbyl group having from 1 to about 20 carbon atoms; X is a halogen; z has a value corresponding to the valence of the transition metal, Tm; n has a value of from one to the valence state of the transition metal, Tm;
   (4) component (D-2) is represented by the formula R$_2$Zn and/or RZnX wherein each R is independently a hydrocarbyl group having from 1 to about 20 carbon atoms and X is a halogen;
   (5) the atomic ratio of Mg:Tm is from about 1:1 to about 40:1 with the proviso that when the transition metal compound contains a halogen atom the ratio is from about 2:1 to about 40:1;
   (6) the atomic ratio of Zn:Tm is from about 0.1:1 to about 5:1;
   (7) the atomic ratio of X:Mg is from about 3:1 to about 12:1; and
   (8) the quantity of $CO_2$ is such that further addition of $CO_2$ to component (A) does not result in any further reaction of $CO_2$ as indicated by no further absorption of $CO_2$ or no further exotherm.

3. A catalytic product of claim 2 wherein
   (1) in component (A) each R and R' is a hydrocarbyl group having from 1 to about 10 carbons, Me is Al and x has a value of from about zero to about 2;
   (2) component (C) is an aluminum alkyl chloride wherein each R$^3$ is independently a hydrocarbyl group having from 1 to about 10 carbons;

(3) in component (D), Tm is titanium;
(4) the atomic ratio of Mg:Tm is from about 5:1 to about 30:1; and
(5) the Zn:Tm atomic ratio is from about 0.2:1 to about 2:1;
(6) the X:Mg atomic ratio is from about 3.5:1 to about 8:1; and
(7) the number of moles of carbon dioxide to atoms of magnesium is from about 1:1 to about 2:1.

4. A catalytic product of claim 3 wherein
(1) component (A) is di-n-hexylmagnesium;
(2) component (C) is ethylaluminum dichloride,
(3) component (D-1) is tetraisopropoxy titanium, and
(4) component (D-2) is diethyl zinc.

5. A catalytic product of claim 1 wherein the product resulting from mixing components (A) and (B) is hydrocarbon soluble.

6. A catalytic product of claim 2 wherein the product resulting from mixing components (A) and (B) is hydrocarbon soluble.

7. A catalytic product of claim 3 wherein the product resulting from mixing components (A) and (B) is hydrocarbon soluble.

8. A catalytic product of claim 4 wherein the product resulting from mixing components (A) and (B) is hydrocarbon soluble.

* * * * *